United States Patent [19]

Kinnick et al.

[11] Patent Number: 5,035,274
[45] Date of Patent: Jul. 30, 1991

[54] WHEEL/TIRE INFLATOR

[75] Inventors: John F. Kinnick, Troy; Frank E. Lashier, Jr., Sterling Heights, both of Mich.

[73] Assignee: Dominion Tool & Die Co., Inc., Roseville, Mich.

[21] Appl. No.: 591,049

[22] Filed: Oct. 1, 1990

[51] Int. Cl.$^5$ .............................................. B60C 25/00
[52] U.S. Cl. ...................................... 157/1.1; 141/38; 137/223
[58] Field of Search ................. 157/1.1, 1.7, 1.2, 1.24; 141/38; 137/223

[56] References Cited

U.S. PATENT DOCUMENTS 4,850,402  7/1984  Cunningham et al. .......... 157/1.1 X
4,947,819  8/1990  Timlin .............................. 157/1.1 X Primary Examiner—James G. Smith
Attorney, Agent, or Firm—Harness, Dickey & Pierce

[57] ABSTRACT

An improved inflator for use in automated wheel/tire assembly lines is disclosed herein. The improved inflator incorporates temperature sensors to sense both the temperature of the compressed air used to inflate the tire and the ambient air temperature in response to which control means will adjust a base reference inflation pressure to compensate for these variables. A pressure sensor is also provided which serves to provide feed back information as to the actual pressure to which the tire is inflated.

13 Claims, 4 Drawing Sheets

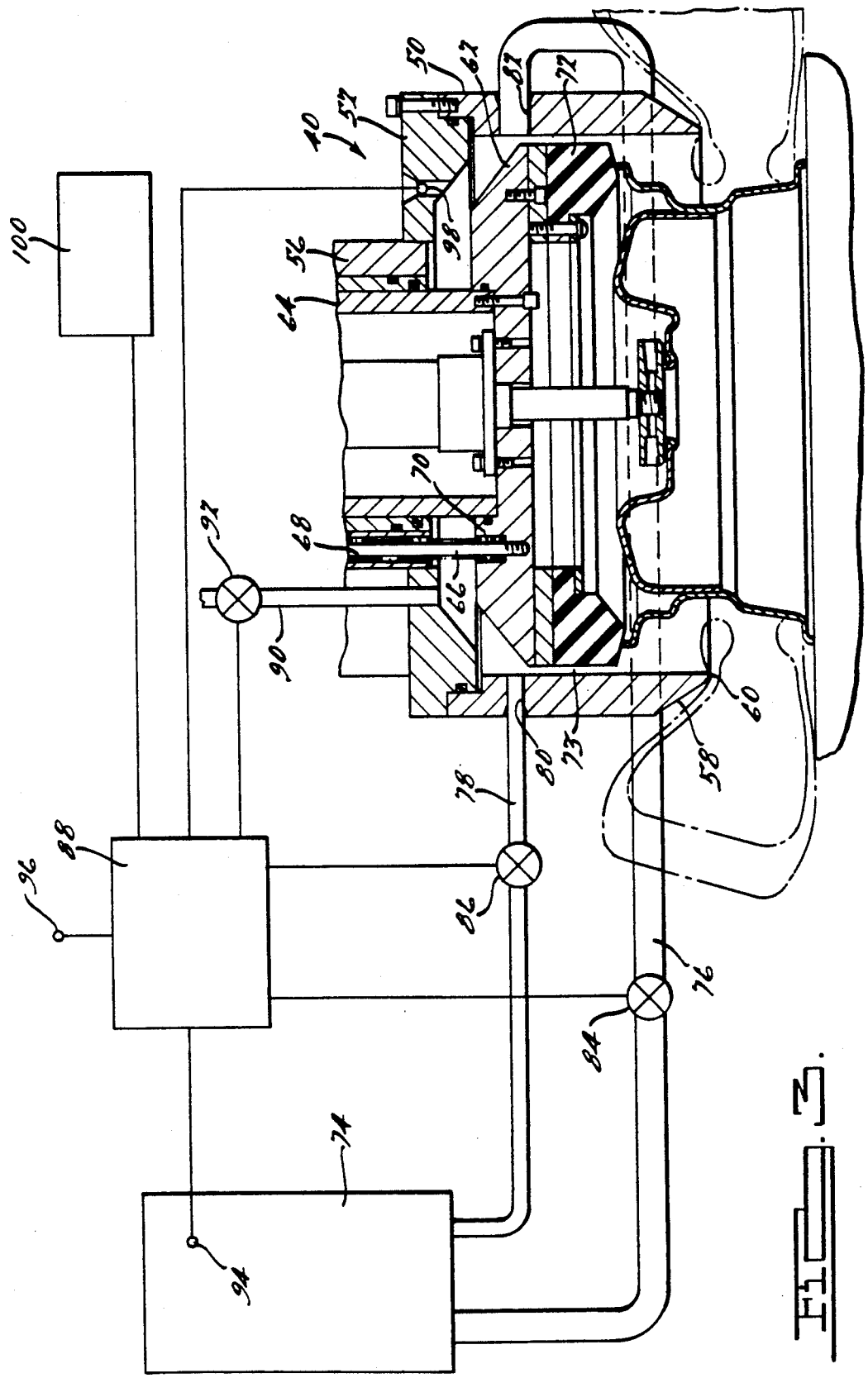

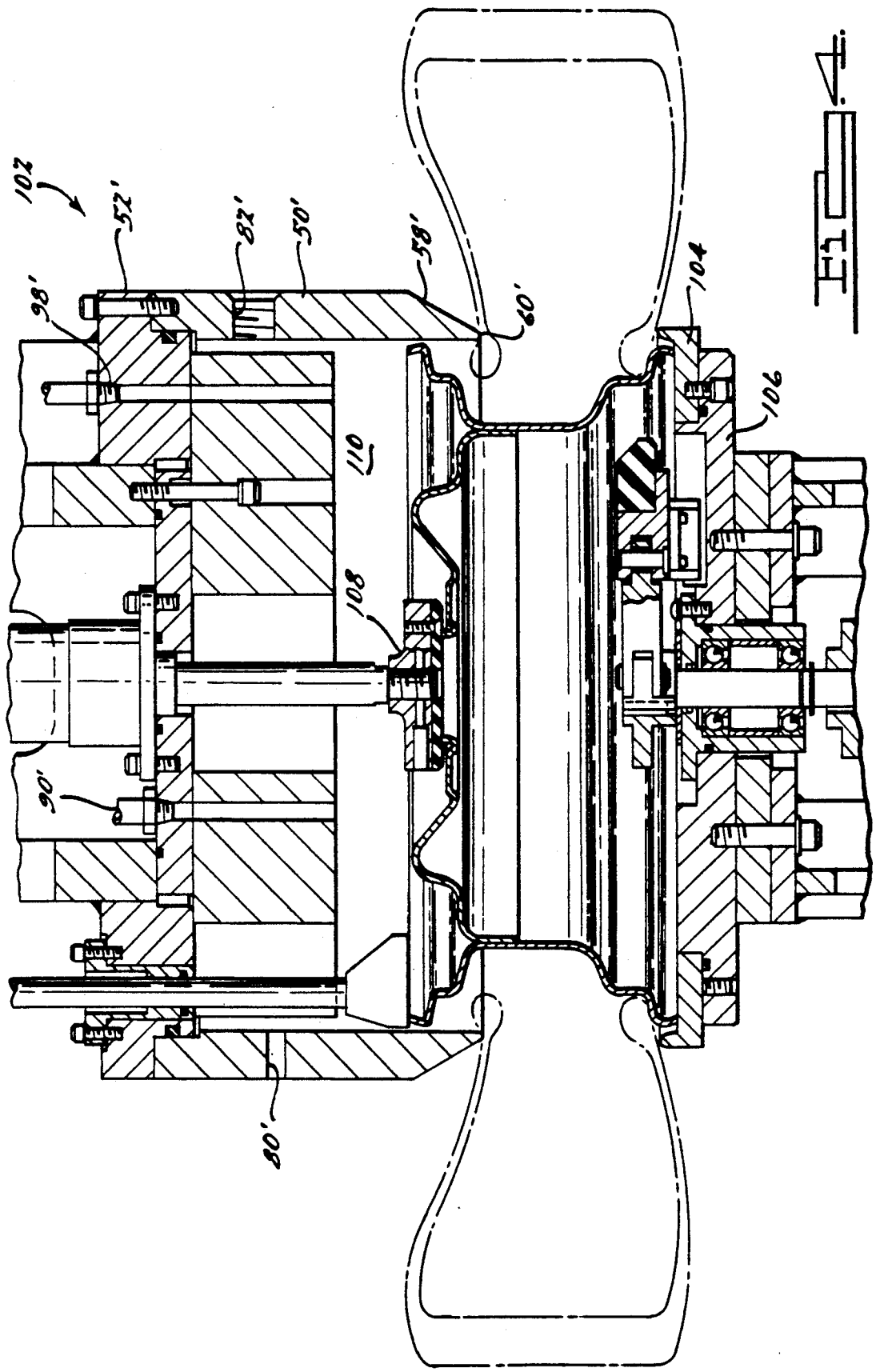

WHEEL/TIRE INFLATOR

BACKGROUND AND SUMMARY OF THE INVENTION

The present invention relates generally to inflators for use in automatically inflating wheel/tire assemblies and more specifically to an improved automatic inflator having the ability to adjust the inflation pressure to compensate for temperature variations encountered in the inflation process.

In a typical automotive assembly plant, wheels and tires are fed via suitable conveyor means from storage locations to an automated tire line where the tire is mounted upon the vehicle wheel, inflated, and possibly balanced in preparation for installation on a motor vehicle. Because most assembly lines even if building only a single motor vehicle model must be able to accommodate a wide variety of optional wheel and tire combinations, the tire lines typically will include means for tracking the individual wheels and tires prior to mating thereof as well as the assemblies thereafter to insure the proper wheel/tire assemblies reaches the intended vehicle in the proper order. The mix which must be handled is even greater when different models are assembled on the same line.

In order to provide the desired ride characteristics, each tire must be properly inflated to a predetermined pressure. This predetermined pressure will vary considerably between different sizes of tires, different brands of tires and different wheels to which the tires are mounted. Further, because of differences between models of motor vehicles and even the options provided on the same models, the predetermined inflation pressure for the same wheel/tire assembly will vary. Additionally, it is not uncommon for a given motor vehicle to require three separate inflation pressures, one for the front tires, another for the rear tires and a third for the spare.

Accordingly, the inflator incorporated in the above mentioned tire line had to be able to accommodate a wide variety of inflation pressures.

While such automated inflators having the capability of accommodating a number of predetermined inflation pressures have been available, these inflators do not incorporate any feed back means to gauge the actual tire pressure and hence they have not been capable of achieving the desired degree of accuracy and consistency in providing tires inflated to the proper pressure. It must be noted that the desired inflation pressure for any given tire will vary depending upon such variables as the temperature of the compressed air and ambient plant temperature. Generally the desired inflation pressure or base inflation pressure for a particular wheel/tire assembly will be referenced to a particular reference temperature and hence for correct measurement of tire pressure, the wheel, tire and air within the tire should all be at this particular reference temperature or alternatively the inflation pressure should be adjusted to compensate for differences from this reference temperature. When wheel/tire assemblies are being inflated in a tire line, typically the pressurized fluid will be at one temperature while the wheel and tire will be at another different temperature, normally that of the ambient air. Both of these temperatures will typically vary from hour to hour and day to day thus requiring continued changes in the adjustments to be made to the base inflation pressure to continually achieve the proper inflation pressure for any given wheel/tire assembly. Inflators presently in use have not incorporated any means to compensate for such temperature variations from such a reference temperature. As a result, the manufacturers have had to compensate dealers for manually adjusting the inflation pressures of the tires as part of the delivery preparation.

The present invention, however, overcomes these problems by incorporating means to automatically sense the temperature of the compressed air used for inflating the tires as well as the ambient plant temperature and adjusting the predetermined inflation pressure to accommodate these variables. Additionally, the inflator of the present invention also incorporates means to sense the actual inflation pressure of the wheel/tire assembly during the inflating process to thereby assure the temperature compensated inflation pressure is actually achieved. The feed back of actual inflation pressure coupled with the process of adjusting the predetermined desired inflation pressure for temperature variations assures that each and every wheel/tire assembly will be properly, accurately, and consistently inflated. As a result, the need for subsequent checking and adjustment of the tire pressure preparatory to delivery of the vehicle to a customer is eliminated thereby offering significant cost savings on each and every vehicle. Additionally, the possibility that service personnel may overlook or neglect to adjust tire pressure and hence deliver a vehicle with improperly inflated tires is also eliminated.

Additional advantages and features of the present invention will become apparent from the subsequent description and the appended claims taken in conjunction with the accompanying drawings.

BRIEF DESCRIPTION OF THE DRAWINGS

FIG. 3 is a diagrammatic view of the control arrangement incorporated in the inflator, a portion of which is shown in section, all in accordance with the present invention; and FIG. 4 is a section view of another inflator also in accordance with the present invention.

DESCRIPTION OF THE PREFERRED EMBODIMENT

Figure 1:
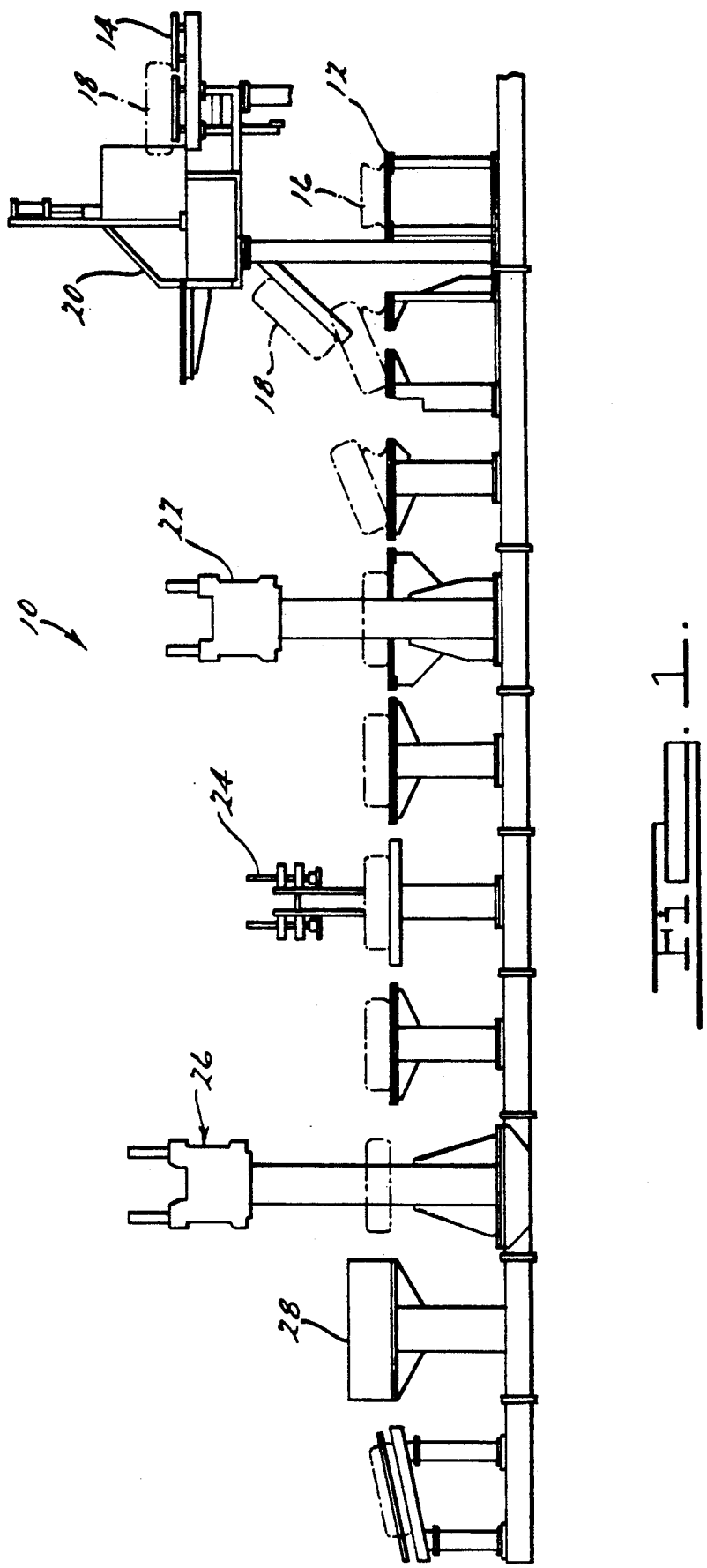
FIG. 1 is a diagrammatical view of a wheel/tire assembly line incorporating an inflator in accordance with the present invention.

Referring now to the drawings and more particularly to FIG. 1, there is shown a tire line indicated generally at 10 which includes conveyor feed means 12 and 14 which operate to transport wheels 16 and tires 18 respectively from remote storage areas to the tire line. A soaper 20 operates to apply a lubricating soap solution to the tire bead whereupon the tire 18 is deposited onto the wheel 16 to which it is to be mounted. The wheel/tire combination is then advanced to a mounter 22 where the tire is mounted onto the desired wheel. Next, the uninflated wheel/tire assembly is advanced to a matcher 24 at which point indicia indicating high and low radial runout points on the respective wheel and tire are moved into alignment so as to render the completed wheel/tire assembly more round. The thus mounted and matched wheel/tire assembly is then advanced to the inflator 26 where compressed air is supplied to inflate the wheel/tire assembly to a predetermined pressure. Thereafter, the now inflated tire is advanced to a load simulator 28 at which point the inflated wheel/tire assembly is rotated and subjected to a load similar to that experienced during initial operation of the motor vehicle. Load simulator 28 will preferably be of the type disclosed and claimed in application Ser. No. 073,170 filed July 13, 1987 and entitled "Wheel/Tire Load Simulating Apparatus", the disclosure of which is hereby incorporated by reference. The thus completed wheel/tire assembly may then be advanced to a balancing station and then transported to a location at which it is installed on the motor vehicle.

It should be noted that some of the stations described above such as matchers and load simulator may be omitted from certain tire lines. Further, other tire lines may incorporate additional stations such as wheel soapers, apparatus for installation of tire stems etc. In any event, this entire tire line operation will be controlled by central control means which will actuate the transfer mechanism to advance the wheels and tires through the line. Additional controls at each work station will operate to control the function of the individual machines.

Figure 2:
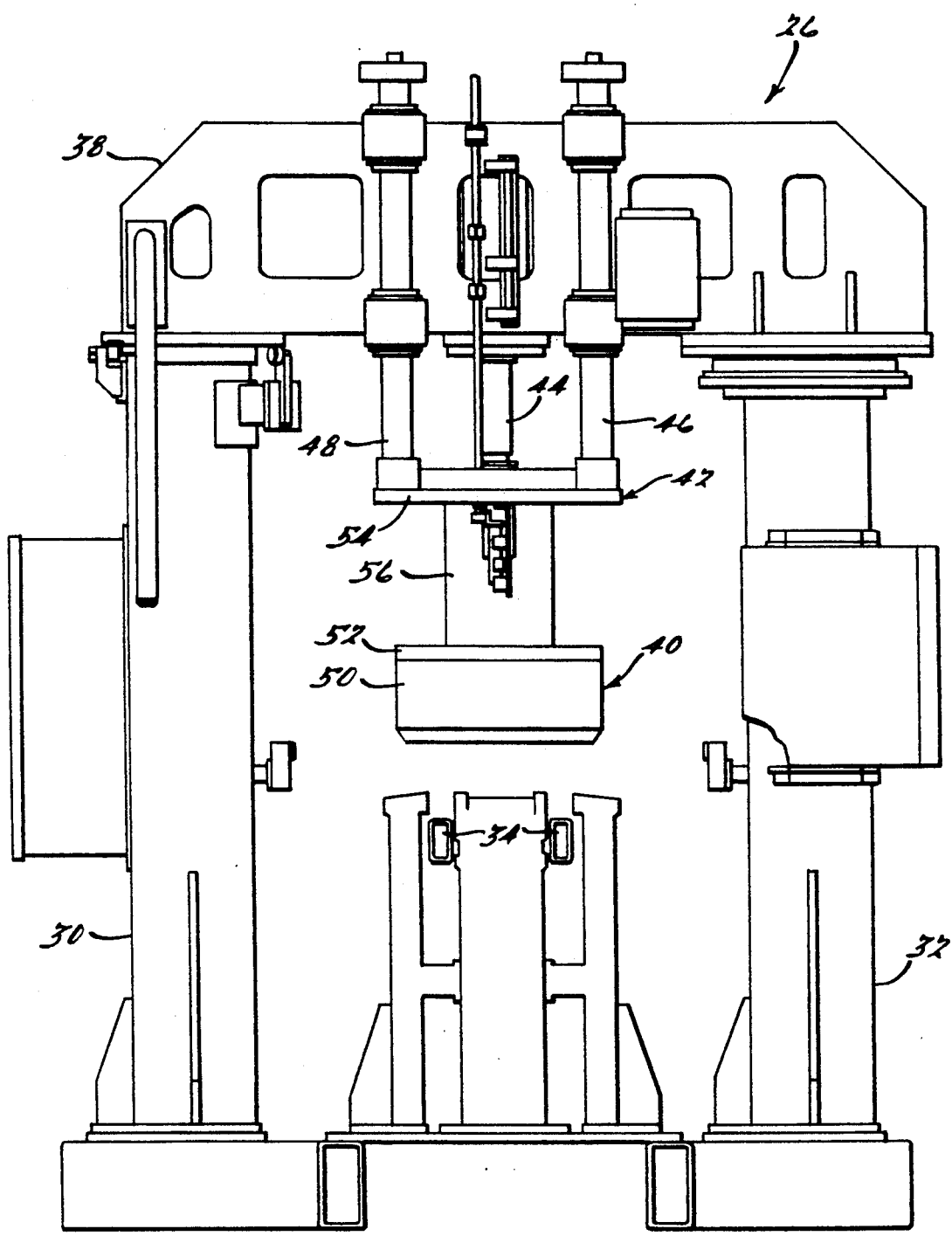
FIG. 2 is an end view of an inflator in accordance with the present invention.

Referring now to FIGS. 2 and 3, the inflator 26 of the present invention will be described in detail. As shown therein, inflator 26 includes a supporting base comprising two upstanding columns 30, 32 positioned on opposite sides of a lift and carry work transfer assembly 34. A center work support assembly 36 is positioned between columns 30 and 32 and operates to support the wheel/tire assembly within the inflator 26.

An upper bridge member 38 extends between and is supported by respective columns 30 and 32 and includes an inflator head 40 supported for vertically reciprocable movement by a carriage assembly 42. A suitable hydraulically actuated cylinder 44 is provided on bridge assembly 38 which operates to effect reciprocal movement of inflator head 40. Additionally, laterally spaced guide bars 46, 48 are provided to guide reciprocal movement of the inflator head.

Inflator head 40 includes an outer cylindrical member 50 secured to a ring member 52 which in turn is secured to a lower plate 54 forming a part of carriage assembly 42 by means of an elongated cylindrical member 56. The lower edge 58 of outer cylindrical member 50 is beveled radially inwardly and includes a rounded, lower nose portion 60 adapted to engage a sidewall of a tire to be inflated and move the upper (as shown) bead thereof out of engagement with the wheel while also urging the lower bead against the lower wheel flange.

A generally circular plate member 62 is movably disposed within cylindrical member 50 being secured to and supported by a cylindrical member 64 telescopically movably received within cylindrical member 56. A plurality of guide rods 66 are secured to plate member 62 and extend into axially extending bores 68 provided in cylindrical member 56. Springs 70 surround each of these rods 66 and serve to bias plate member 62 axially downwardly (as shown). A sealing ring 72 is secured to the lower (as shown) surface of plate member 62 and operates to sealingly engage a flange portion of the vehicle wheel. As shown, the diameter of plate 62 and sealing ring 72 is less than the inside diameter of cylindrical member 50 so as to define a fluid passage 73 therebetween through which compressed air may flow into the interior of tire 18.

In order to supply compressed air for inflation of the tire, a surge tank or reservoir 74 is provided which is connected to a suitable source of compressed air. The surge tank has two supply lines 76 and 78 extending therefrom to openings 80, 82 provided in the sidewall of cylindrical member 50. Suitable electrically actuated control valves 84, 86 are provided in respective supply lines 76, 78 to control air flow therethrough. Valves 84 and 86 are each electrically connected to and controlled by a central controller 88. A bleed line 90 is also connected to plate member 52 and communicates with the passage 73. An electrically controlled valve 92 is connected in bleed line 90, the operation of which is controlled by controller 88.

Controller 88 has a pair of temperature sensors 94, 96 connected thereto one of which is disposed within the surge tank 74 and the other of which is located in a suitable location so as to sense the ambient plant air temperature. A pressure sensor 98 is also provided being disposed within cylindrical member 50 and connected to controller 88 whereby the actual inflation pressure of the tire may be sensed and a signal indicative thereof supplied to controller 88. Additionally, controller 88 has an input means 100 connected thereto whereby information indicative of the wheel type, tire type, and vehicle model as well as relevant accessories incorporated on the vehicle model to which the wheel and tire are to be mounted may be inputted so that controller 88 may select the desired inflation pressure.

In operation, the transfer apparatus 34 will operate to advance a wheel/tire assembly into the inflator station whereupon an inflation cycle will be initiated. At this time, input means 100 will supply to controller 88 the necessary information to identify the type of wheel, type of tire and particular vehicle to which the tire is to be mounted. This information may also include options installed on the intended vehicle if those options affect the desired inflation pressure and thus enables controller 88 to select the proper base inflation pressure for this wheel/tire assembly Additionally, controller 88 will receive signals indicative of the ambient temperature and the temperature of the compressed air within the surge tank from sensors 96 and 94 respectively. Based upon this information controller 88 will determine the required or adjusted inflation pressure for the wheel/tire assembly disposed within the work station. It should be noted that preferably controller 88 will be receiving temperature indicative signals on a regular recurring basis and the actual adjusted inflation pressure determinations will be based upon an average of a series of signals taken over a period of time. In this manner greater accuracy is assured as slight transient variations will be averaged.

While controller 88 is determining the proper adjusted inflation pressure, the inflator head 40 will be cycled downwardly so as to move sealing ring 72 into sealing engagement with the vehicle wheel and the lower edge portion 58 of cylinder member 50 into sealing engagement with the tire. Preferably, to insure fluid communication between passage 73 and the interior of tire, cylinder member 50 will advance downwardly so as to depress the sidewall of the tire and thus move the upper bead out of engagement with the vehicle wheel so as to assure a passage for entry of air into the interior of the tire.

At this point, controller 88 will initiate the actual inflation by actuating both valves 84 and 86 to a full open position while maintaining valve 92 in a closed position. This will result in rapid pressurization of the entire space enclosed bY tire 18, wheel 16, sealing ring 72, plates 62 and 52 and cylindrical member 50 which space includes the interior of the tire. As the pressure within this space as sensed by pressure sensor 98 approaches within about 2 psi of the predetermined adjusted inflation pressure for this particular wheel/tire assembly, controller 88 will operate to close valve 84 thereby reducing the flow rate of compressed air into the enclosed space. Valve 86 will be maintained in an open position until the pressure sensed by pressure sensor 98 indicates a pressure within the space equal to the predetermined adjusted inflation pressure plus a predetermined amount. In tire lines which incorporate a load simulator as mentioned above, this predetermined amount will preferably be about .5 psi as the load simulator will insure proper seating of the tire beads on the rim. However, in tire lines not incorporating a load simulator or in which the load simulator is not operating, the wheel/tire assembly will be inflated to a pressure well in excess of 0.5 psi above the adjusted inflation pressure, preferably about 5.5 psi above. This additional 5 psi pressure is required in order to aid in proper seating of the tire bead with the wheel rim. In any event, once the tire has been inflated preferably about 0.5 psi, controller 88 will close valve 86 and actuate valve 92 to an open position thereby allowing air to bleed off and the inflation pressure to be reduced to the predetermined desired adjusted inflation pressure in those situations where a wheel/tire load simulator is operational in the line. However, where no such load simulator is operating, the inflation pressure will be reduced only to about 5 psi above the adjusted inflation pressure in order to facilitate proper bead seating.

It should be noted that bleed line 90 is of substantially smaller size than either line 76 or line 78 so as to provide a slower rate of change in the tire inflation pressure during this bleed off procedure. This slower rate of change in the inflation pressure allows a greater reaction time for controller 88 to sense the actual pressure and close the bleed valve 92. Similarly, line 78 is substantially smaller in size than line 76. Thus, a maximum rate of change in inflation pressure is initially provided when both lines 76 and 78 operate to supply air to thereby minimize the cycle time required to inflate the tire. However, in order to avoid possibly excessively overshooting the desired inflation pressure, only the smaller line 78 is utilized as the inflation pressure is increased the last 2-2.5 psi. It should be noted that were the available cycle time sufficiently long, the present invention could be easily modified to eliminate the need to overinflate and bleed off pressure to achieve the adjusted inflation pressure. Further, it may be possible in some applications to employ a single supply line from the reservoir with either an on-off valve or a suitable modulating valve operated by the control means to progressively reduce the flow rate as the adjusted inflation pressure is approached.

In any event, once the desired inflation pressure is reached, valve 92 is closed and outer cylinder 50 retracted thereby allowing the upper (as shown) tire bead to move into sealing relationship with the flange of the vehicle wheel. The sealing member 72 will remain in sealing engagement with wheel 16 until the tire bead has fully seated after which it will be raised along with continued movement of cylinder member 50. Thereafter, the now inflated wheel/tire assembly will be advanced to the next station while a new uninflated assembly is moved into the work station and the cycle repeated.

Referring now to FIG. 4, there is shown another type of inflator head indicated generally at 102 often utilized in motor vehicle tire lines which incorporates the present invention. Inflator head 102 is generally similar to inflator head 40 described above with certain exceptions noted below and accordingly, like portions thereof are indicated by the same reference numbers primed.

A sealing ring 104 is provided which is secured to an underlying support structure 106 and serves to engage the lower axially outwardly extending flange portion of the vehicle wheel. As shown, the radial width of sealing ring 104 is selected so as to enable it to create a sealing relationship with a range of different sized vehicle wheels. A center hold down foot 108 is also provided which is reciprocatingly supported within head 102 and serves to urge the vehicle wheel into engagement with sealing ring 104.

As thus described, a sealed chamber 110 is defined by the interior of the tire to be inflated, cylindrical ring 50', 52', sealing ring 104 and support structure 106. A pair of openings 80' and 82' are provided whereby compressed air may be supplied to sealed chamber 110 and thus to the interior of the tire to be inflated in like manner as described above. Similarly, a bleed line 90' and pressure sensor 98' are also provided each of which operates in the same manner as described above with respect to bleed line 90 and pressure sensor 98. Thus, it will be appreciated that the principle difference between inflator head 102 and 40 is the use of a sealing ring engaging the lower flange of the vehicle wheel as opposed to a reciprocated sealing ring but otherwise the function and operation of inflator head 102 and associated controls will be substantially identical to that described above with reference to inflator head 40 and its associated controls Thus, as may now be appreciated, the present invention assures that each and every tire is inflated to the desired inflation pressure which desired inflation pressure is adjusted to compensate for both the temperature of the compressed air as well as the plant ambient conditions. Thus, as the base inflation pressures are referenced to a particular temperature, the inflator of the present invention is able to compensate for ambient temperature conditions existing in the plant at the time of inflation be it above or below the reference temperature. Further, because the controller also senses the temperature of the compressed air being used for inflating the tire, it is also able to adjust in the actual inflation pressure to compensate for variations above or below the reference temperature. Because the actual inflation pressure used has been adjusted to compensate for temperature variations from the base or reference temperature at which the desired inflation pressure was determined, the wheel/tire assembly will be properly inflated regardless of the final destination to which the vehicle is ultimately shipped when the present invention is used in conjunction with a load simulator. This thus eliminates the need to readjust inflation pressures at the time the vehicle is delivered to the purchaser and hence affords substantial cost savings. This also provides greater assurance that the vehicle as delivered to the customer will have properly inflated tires.

While it will be apparent that the preferred embodiments of the invention disclosed are well calculated to provide the advantages and features above stated, it will be appreciated that the invention is susceptible to modification, variation and change without departing from the proper scope or fair meaning of the subjoined claims.

I claim:

1. An improved inflator for automatically inflating wheel/tire assemblies comprising:
   a reciprocating inflator head movable into engagement with a wheel/tire assembly, said inflator head including a first portion operative to sealingly engage the sidewall of said tire and a second portion operative to sealingly engage said vehicle wheel, said first and second portions cooperating with said wheel and said tire to define a sealed chamber in fluid communication with the interior of said tire;
   a reservoir of compressed air;
   first and second supply lines extending from said reservoir to said sealed chamber;
   first and second valve means provided in said first and second supply lines respectively for selectively controlling flow of said compressed air to said wheel/tire assembly;
   a bleed line in fluid communication with said sealed chamber;
   bleed valve means selectively operative to place said sealed chamber in fluid communication with the atmosphere;
   central control means;
   first temperature sensing means operative to provide a signal to said central control means indicative of the temperature of said compressed air in said reservoir; and
   second temperature sensing means operative to provide a signal to said central control means indicative of the ambient temperature;
   said central control means being operative to adjust a base inflation pressure to compensate for differences in the sensed ambient temperature and temperature of said compressed air from a reference temperature for said base inflation pressure and to thereafter control said first and second valve means and said bleed valve means to inflate said tire to said adjusted base inflation pressure.

2. An inflator as set forth in claim 1 further comprising pressure sensing means operative to supply a signal to said central control means indicative of the inflation pressure of said tire.

3. A method for accurately inflating a wheel/tire assembly comprising:
   sensing the temperature of a reservoir of compressed air to be used for inflating said wheel/tire assembly;
   sensing the ambient air temperature;
   adjusting a base inflation pressure in accordance with said sensed temperature of said compressed air and said sensed ambient air temperature to compensate for variances between said sensed temperatures and a reference air temperature for said base inflation pressure; and
   inflating said wheel/tire assembly with said compressed air to said adjusted base inflation pressure 4. The method as set forth in claim 3 further comprising continuously sensing said inflation pressure as said wheel/tire assembly is inflated.

5. The method as set forth in claim 4 further comprising inflating said wheel/tire assembly to a pressure exceeding said adjusted based inflation pressure by a predetermined pressure and thereafter bleeding off said predetermined pressure.

6. The method as set forth in claim 3 wherein said reservoir of compressed air includes first and second supply lines for conducting said compressed air to said wheel/tire assembly, each of said supply lines incorporating independently actuable control valves, one of said supply lines being substantially larger than the other, said method comprising initially opening both of said control valves until the inflation pressure of said wheel/tire assembly reaches a valve a predetermined amount less than said adjusted base inflation pressure and thereafter closing one of said valves and continuing to inflate said wheel/tire assembly via only one of said first and second supply lines.

7. An improved inflator for automatically inflating a wheel/tire assembly to a desired inflation pressure comprising:
   an inflator head assembly reciprocably movable into sealing engagement with said wheel/tire assembly to thereby define a chamber communicating with the interior of said tire;
   a reservoir of compressed air;
   a supply line connecting said reservoir to said inflator head assembly, said supply line including valve means whereby compressed air may be selectively supplied to said chamber;
   control means for controlling said valve means;
   pressure sensing means for sensing the pressure within said chamber and supplying a signal indicative thereof to said control means;
   first temperature sensing means for sensing the temperature of the compressed air in said reservoir and supplying a signal indicative thereof to said control means; and
   second temperature sensing means for sensing the ambient air temperature and supplying a signal indicative thereof to said control means;
   said control means being operative to adjust a base inflation pressure in response to signals from said first and second temperature sensing means to accommodate differences between said sensed temperatures and a reference temperature for said base inflation pressure, said control means being operable to close said valve means in response a signal from said pressure sensing means whereby said wheel/tire assembly is inflated to substantially said adjusted base pressure.

8. An inflator as set forth in claim 7 wherein said control means is operative to close said valve means when said pressure in said chamber sensed by said pressure sensing means reaches a valve a predetermined amount above said adjusted base inflation pressure and further comprising a bleed line communicating with said chamber, said bleed line including selectively actuable valve means controlled by said control means whereby said chamber pressure is reduced to substantially said adjusted base inflation pressure.

9. An inflator as set forth in claim 7 further comprising a second supply line connecting said reservoir to said inflator head for supplying compressed air to said chamber, said second supply line including second valve means controlled by said control means.

10. An inflator as set forth in claim 9 wherein said second supply line is substantially larger than said supply line.

11. An inflator as set forth in claim 10 wherein said control means is further operative to close said second valve means in response to a pressure sensed by said pressure sensing means less than said adjusted base inflation pressure.

12. An inflator as set forth in claim 11 wherein said control means is operative to close said valve means when said pressure in said chamber sensed by said pressure sensing means reaches a valve a predetermined amount above said adjusted base inflation pressure and further comprising a bleed line communicating with said chamber, said bleed line including selectively actuable valve means controlled by said control means whereby said chamber pressure is reduced to substantially said adjusted base inflation pressure.

13. Control means for controlling an automatic tire inflator, said tire inflator including a reservoir of pressurized fluid for use in inflating said tire and selectively actuable control valve means for controlling flow of said pressurized fluid to said tire, said control means comprising:

a central controller;

first temperature sensing means for sensing the temperature of said pressurized fluid and supplying a signal indicative thereof to said central controller;

second temperature sensing means for sensing the ambient temperature and supplying a signal indicative thereof to said central controller; and pressure sensing means for sensing the pressure within said tire and supplying a signal indicative thereof to said control means;

said control means being operative to adjust a base inflation pressure to accommodate differences between a reference temperature for said base inflation pressure and the temperatures sensed by said first and second temperature sensing means and to control said valve means in response to said pressure sensing means whereby said tire is inflated to a pressure related to said adjusted base inflation pressure by a predetermined amount.

* * * * *